United States Patent [19]

Finck, Jr.

[11] 4,254,647
[45] Mar. 10, 1981

[54] FORCE-RESISTANT LOCKING DEVICES

[75] Inventor: Frederick P. Finck, Jr., Fairfield, Conn.

[73] Assignee: Highfield Mfg. Company, a Division of Clarkson Industries, Inc., Bridgeport, Conn.

[21] Appl. No.: 931,364

[22] Filed: Aug. 7, 1978

[51] Int. Cl.³ .................. B65D 55/14; E05B 65/52
[52] U.S. Cl. .................................. 70/77; 70/9; 70/63; 70/159; 70/164; 70/DIG. 34; 292/284; 292/DIG. 11
[58] Field of Search ............... 70/63, 77, 78, 159–162, 70/169, 229, 232, 6–12, 230, 164, 101; 292/282, 283, 284, 148, 150, 137, 151

[56] References Cited

U.S. PATENT DOCUMENTS

| 1,573,579 | 2/1926 | Ross | 292/137 X |
|---|---|---|---|
| 1,650,578 | 11/1927 | Wyman | 70/164 |
| 1,790,656 | 2/1931 | Ganz | 70/232 X |
| 2,166,660 | 7/1939 | Handshy et al. | 70/9 |
| 2,458,046 | 1/1949 | Audet | 70/6 X |
| 3,157,040 | 11/1964 | Raye | 70/6 X |
| 3,973,420 | 8/1976 | Brady et al. | 70/78 |
| 4,096,718 | 6/1978 | Michelman et al. | 70/63 |
| 4,114,409 | 9/1978 | Scire | 70/230 X |
| 4,120,182 | 10/1978 | Michelman et al. | 70/63 |
| 4,120,183 | 10/1978 | Walters | 70/159 |
| 4,144,729 | 3/1979 | Nielsen, Jr. | 70/63 |
| 4,152,910 | 5/1979 | Swisher | 70/159 |

FOREIGN PATENT DOCUMENTS

| 396442 | 6/1924 | Fed. Rep. of Germany | 292/151 |
|---|---|---|---|
| 1380239 | 1/1975 | United Kingdom | 292/283 |

Primary Examiner—Ramon S. Britts
Assistant Examiner—Carl F. Pietruszka
Attorney, Agent, or Firm—Cifelli & Frederick

[57] ABSTRACT

Force-resistant locking devices for electric meter boxes with hinged covers, or the like, comprise a stud member mounted to a wall of the box and a flange member received on the stud member, the flange member including a flange overlying a marginal portion of the cover to keep it closed. The flange and stud members together define an opening receiving and fully enclosing a utility lock for securing the flange and stud members together. In one embodiment, the flange member is an angle iron with rectangular metal stock welded to one leg, and the stud is cylindrical and received in an opening through the flange member. The lock-receiving opening intersects the stud-receiving opening and the shear strength of the utility lock holds the locking device together. In another embodiment, the flange member is a section of channel iron and receives a rectangular stud, the lock-receiving opening deployed to utilize the shear strength of the lock. In a further embodiment, the flange member includes a polygonal post engagingly received in the stud member, and the lock-receiving opening is axially aligned with the post.

14 Claims, 12 Drawing Figures

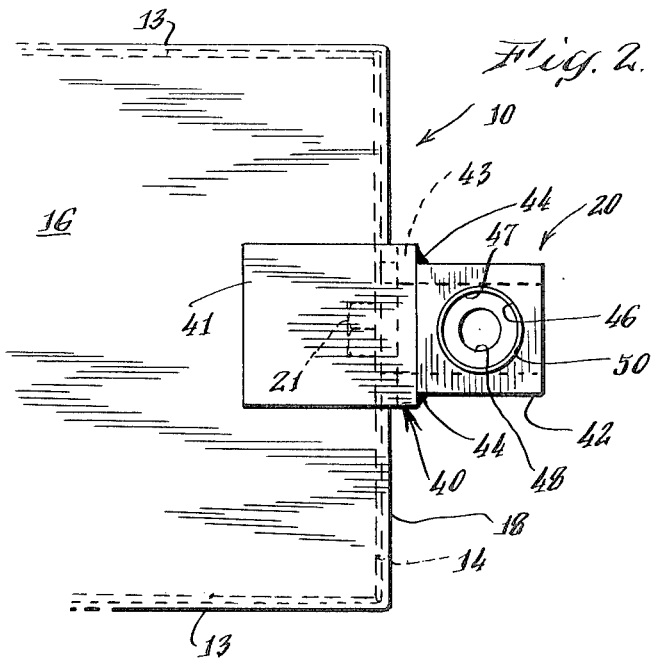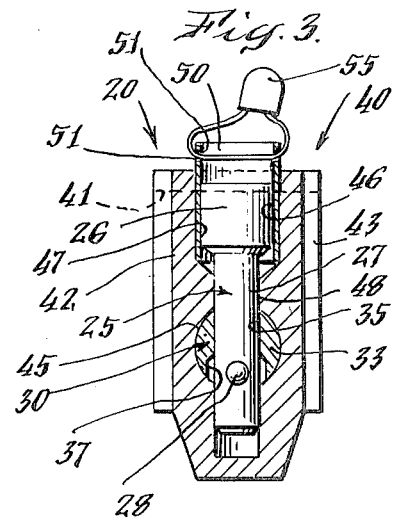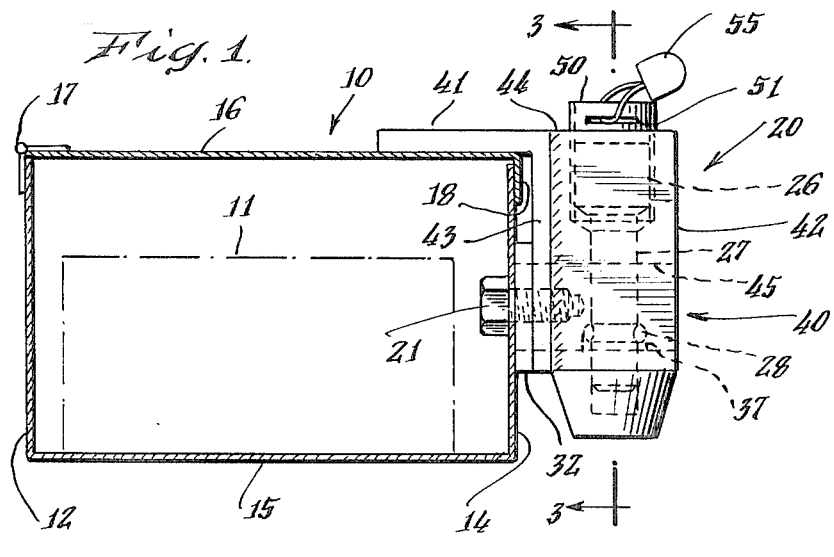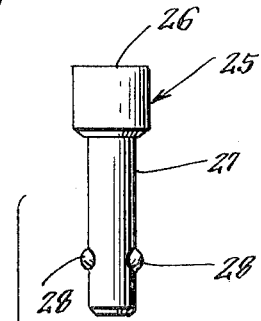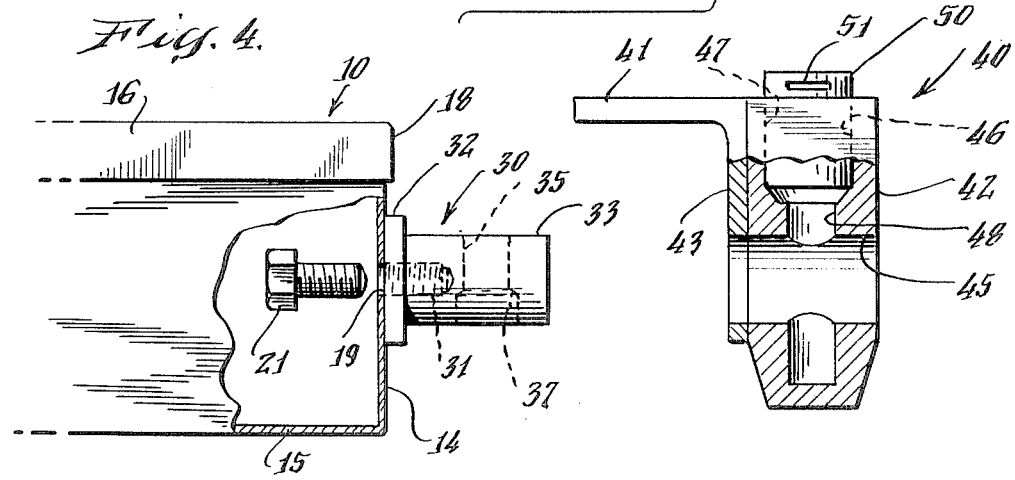

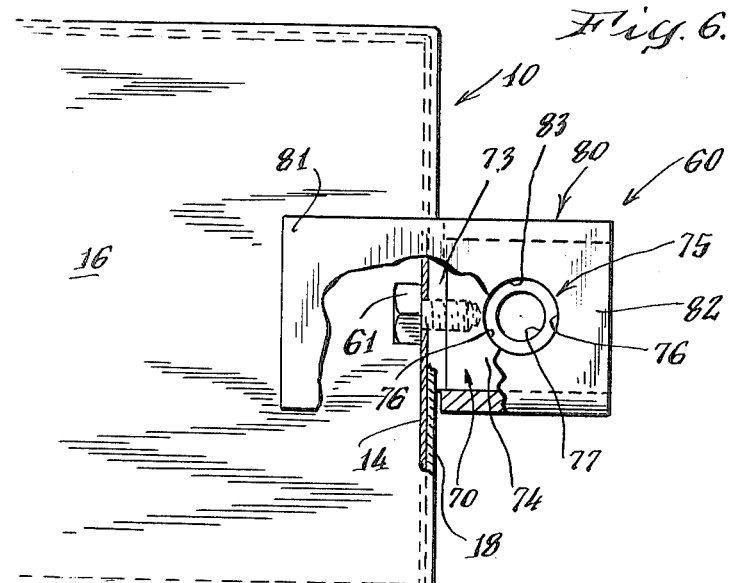
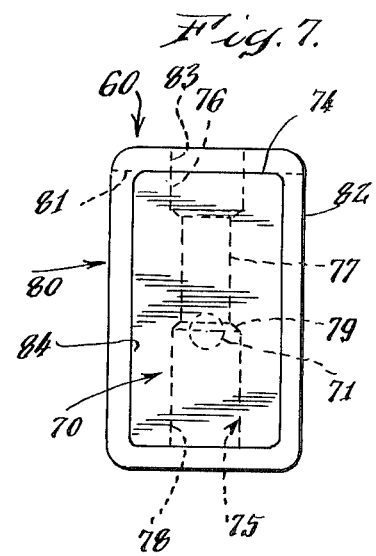
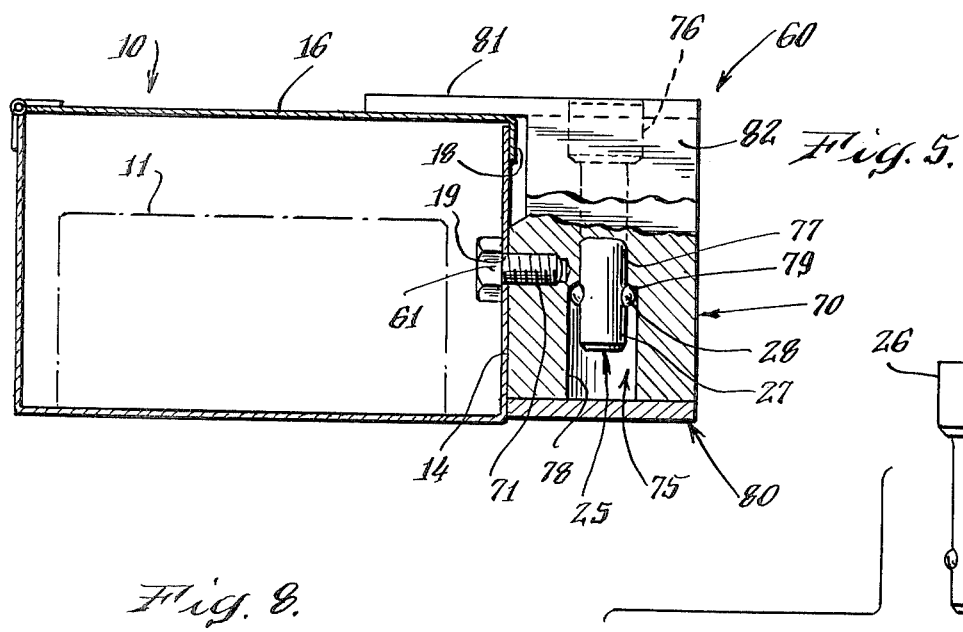
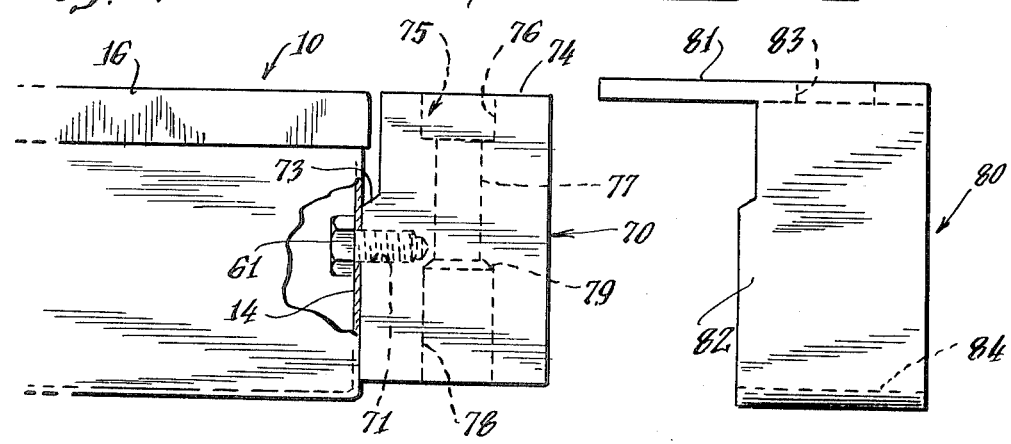

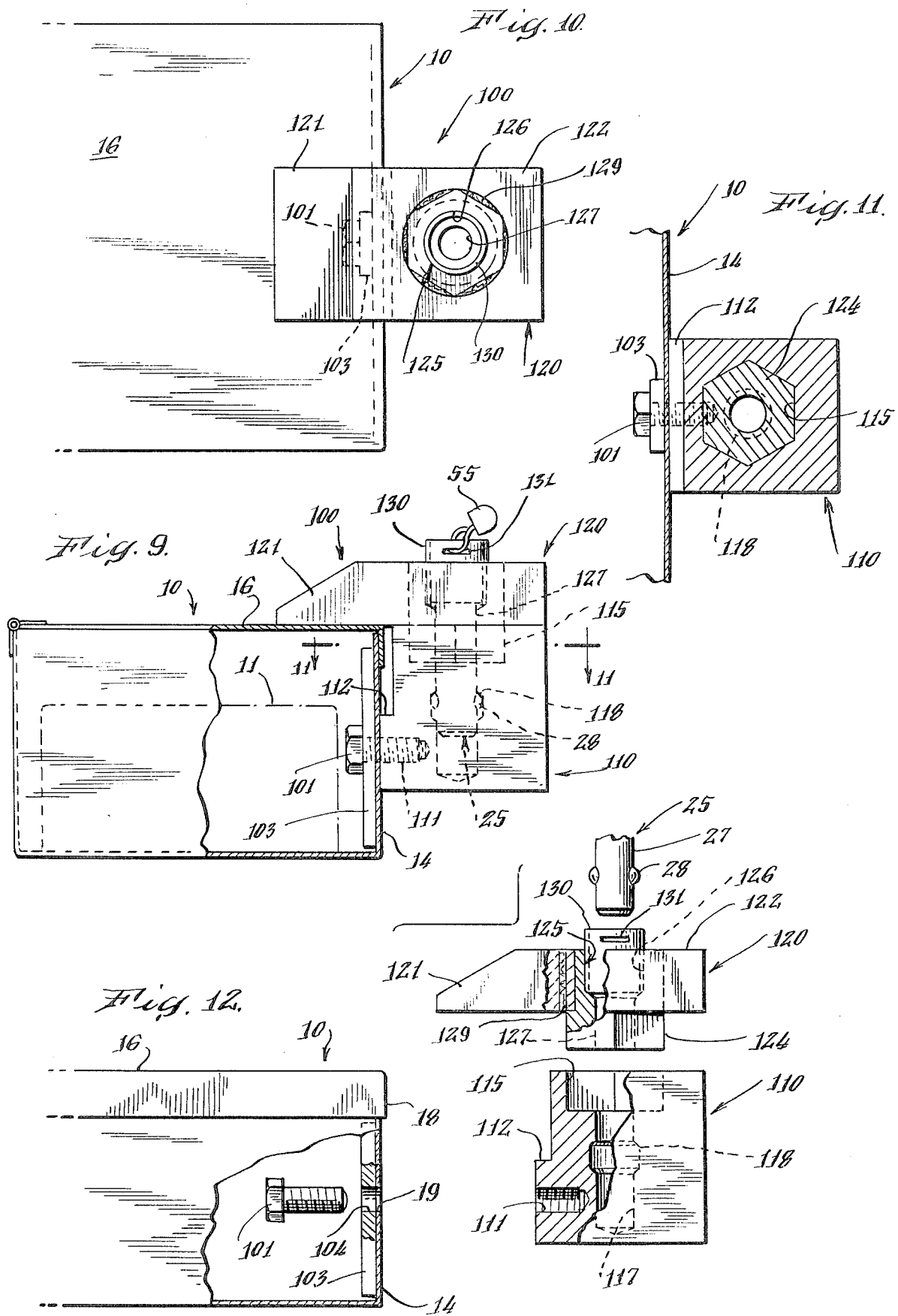

FORCE-RESISTANT LOCKING DEVICES

BACKGROUND OF THE INVENTION

This invention relates to force-resistant locking devices for electric meter boxes or the like which utilize a plunger-type lock of the standard size and shape.

There is a growing need to secure electric meter boxes or other similar utility enclosures in order to prevent the theft of utility services. Theft of electricity by tampering with or bypassing the usual electric meter connections enclosed in such meter boxes is becoming more and more common, particularly since the cost of electricity has been rising rapidly. The losses in revenue experienced by utility companies due to theft have become very high. Further, it is desirable to secure the electric meter boxes because there is a great danger to those tampering with the electric meters inside, as current of potentially deadly magnitude is involved.

Accordingly, it has become increasingly important to take all possible steps to prevent the theft and attempted theft of electricity by securing meter boxes and locking devices have been proposed for this purpose. An example of a locking device for electric meter boxes is found in U.S. Pat. No. 4,031,722. However, the previously proposed locking devices have not met the requirements of strength, i.e. force resistance, necessary to survive in some of the high theft-rate service areas. In particular, the locking device of that patent does not enclose the utility lock and offers several channels of access for crowbars and the like. It has been found that those seeking to break into electric meter boxes for the purposes of stealing electricity do not hesitate to employ great amounts of force through the use of hammers, crowbars and the like.

Therefore, in order to be satisfactory, a locking device must be easily installed on existing meter boxes and resist forceful attempts at entry.

SUMMARY OF THE INVENTION

Accordingly, it is a principal object of the invention to provide locking devices for electric meter boxes or the like which are force resistant.

It is an additional object of the invention to provide force-resistant locking devices for electric meter boxes which utilize a standard utility lock.

It is another object of the invention to provide force-resistant locking devices for electric meter boxes which utilize a standard utility lock and wherein the utility lock is fully enclosed and protected.

It is a further object of the invention to provide force-resistant locking devices for electric meter boxes which are easily installed on existing meter box installations.

Force-resistant locking devices according to the invention herein comprise a stud member adapted to be attached to the wall of an electric meter box adjacent the free edge of its hinged cover and a flange member which is matingly received with the stud member, the flange and stud members jointly defining an opening for receiving and substantially surrounding a utility lock which secures the stud and flange members together, the flange member being characterized by a flange which extends over a marginal portion of the cover adjacent its free edge, thereby securing the box in its closed position.

In preferred embodiments, the stud member extends into an opening in the flange member, which thereby surrounds the stud. A lock-receiving opening in the flange member intersects the stud-receiving opening, and the stud also defines a lock-receiving opening. The lock-receiving openings are aligned and a utility lock is inserted and secured by the usual protruding balls which are engaged under a shoulder provided in the lock-receiving opening. Separation of the stud and flange members would require shearing of the lock. In one embodiment, the flange member comprises a section of angle iron having a metal bar welded thereto, the metal bar having the lock-receiving opening formed in it. In another embodiment, the flange member comprises a section of channel stock with an integral flange, the stud being received in the channel opening.

In a further embodiment, the flange member is positioned adjacent the stud member, and the flange member includes a depending post portion engagingly received in the stud member to prevent rotation of the flange from its cover-securing position. A utility lock is used to secure the flange and stud members together.

The force-resistant locking devices according to the invention herein are all exceptionally strong and are highly resistant to unauthorized removal because of their strength and because they enclose the utility lock used therewith, and do not provide access for pry bars.

Other and more specific objects and features of the invention will in part be obvious and will in part appear from a perusal of the following description of the preferred embodiments and the claims, taken together with the drawings.

DRAWINGS

FIG. 1 is a side elevation view of a first locking device according to the invention herein shown installed on an electric meter box;

FIG. 2 is a top view of the locking device of FIG. 1;

FIG. 3 is a vertical sectional view of the locking device of FIG. 1 taken along the lines 3—3 of FIG. 1;

FIG. 4 is an exploded side elevation view of the locking device of FIG. 1;

FIG. 5 is a side elevation view of another locking device according to the invention herein shown installed on an electric meter box;

FIG. 6 is a top view, partially cut away, of the locking device of FIG. 5;

FIG. 7 is an end view of the locking device of FIG. 5;

FIG. 8 is an exploded side elevation view of the locking device of FIG. 5;

FIG. 9 is a side elevation view of another locking device according to the invention herein shown installed on an electric meter box;

FIG. 10 is a top view, partially cut away, of the locking device of FIG. 9;

FIG. 11 is a sectional view of the locking device of FIG. 9 taken along the lines 11—11 of FIG. 9; and FIG. 12 is an exploded side elevation view of the locking device of FIG. 9.

The same reference numerals refer to the same elements throughout the various Figures.

DESCRIPTION OF PREFERRED EMBODIMENTS

The force-resistant locking devices according to the invention herein are useful in maintaining an electric meter box in its closed condition, thereby protecting the enclosed electric meter or wiring connections from being tampered with to steal electricity. The electric meter boxes are relatively standard, and with reference to FIG. 1, an electric meter box 10 housing an electric meter 11 includes a back wall 12, side walls 13, a front wall 14, and a bottom 15. The electric metor box 10 is provided with a cover 16 hingedly mounted to the back wall 12 by means of a hinge 17. The cover 16 is typically provided with a flange 18 which fits partially over the front wall 14 and side walls 13 when the electric meter box 10 is closed.

Referring now to FIGS. 1-4, a first force-resistant locking device 20 according to the invention herein is shown. The locking device 20 includes a stud member 30 and a flange member 40 which are secured together by a standard utility lock 25 in order to maintain the electric meter box 10 closed. The utility lock 25 is of the plunger type having a head 26, a shank 27 and expansible balls 28 operated by an internal plunger. Several manufacturers make such locks, and they have a standard outside configuration and size, although internal parts and key structures differ between manufacturers.

With particular reference to FIG. 4, the stud member 30 is secured to the electric metor box 10 by means of a machine screw 21 passing through an opening 19 in the front wall 14, the machine screw 21 being received in a threaded opening 31 in the stud member 30. The stud member 30 includes a thin rectangular base 32 positioned adjacent the flange 18 of the cover 16 and a cylindrical stud 33 which extends perpendicularly outwardly from the base 32 and front wall 14. The stud 30 defines a lock-receiving opening 35 therethrough, with the axis of the opening 35 being disposed generally parallel to the front wall 14 of the electric meter box 10 and generally perpendicular to the cover 16 when it is closed. The lower portion of the opening 35 is enlarged to define a shoulder 37 as best seen in FIG. 4.

The flange member 40 of the locking device 20 includes a flange 41 and a body 42 which defines an opening 46 for receiving the utility lock 25, as more fully discussed below. The flange 41 is conveniently one leg of an L-shaped angle iron (actually fabricated of steel) and the body 42 comprises a section of a square cross section steel rod which is welded to a second leg 43 of the angle iron, as indicated at 44 in FIGS. 1 and 2. A transverse cylindrical opening 45 is defined through the body 42 and leg 43, the opening 45 sized to matingly receive the cylindrical stud 33 of the stud member 30. The lock-receiving opening 46 is perpendicular to the stud receiving opening 45, and openings 45 and 46 intersect. The lock-receiving opening 46 has a larger diameter upper portion 47 for receiving the head 26 of the utility lock 25, and a smaller diameter lower portion 48 for receiving the shank 27 of the utility lock. A tubular sleeve 50 is preferably secured in the upper portion 47 of the opening 46 and extends above the body 42, where slots 51 are provided.

The locking device 20 is used with the meter box 10 by first installing the stud member 30 on the front wall 14. The cover 16 is pivoted to its closed position, and the flange member 40 is mounted to the stud member 30. In particular, the cylindrical stud 33 is fully received in the opening 45 of the flange member 40, and the end of cylindrical stud 33 is flush with the outside surface of body 42. The flange 41 overlays the marginal edge of the cover 16 opposite the hinge 17. The rectangular base 32 of the stud member 30 spaces the flange member 40 of the locking device 20 away from the wall 14 of the electric meter box 10, thereby accommodating the flange 18 of the cover 16.

When the stud member 30 and the flange member 40 are assembled together as described above, the lock-receiving opening 46 of the flange member and the lock-receiving opening 35 of the stud member are aligned. The utility lock 25 is inserted and locked, i.e., the locking mechanism is manipulated to drive the balls 28 to their locked position protruding outwardly from the shank 27. The balls 28 are received under the shoulder 37 of the stud member 30, and thus, the utility lock is retained in the locking device 20 and secures the stud member 30 and flange member 40 together.

A seal 55 may be installed through slots 51 of the tubular sleeve 50, and the seal 55 limits access for the attempted picking of utility lock 25. The seal 55 also provides a visual indication of whether the utility lock 25 has been removed, such as with a stolen key or by picking means which avoided the seal.

The locking device 20 is highly force-resistant. The utility lock 25 is fully enclosed in the locking device 20 and is thus shielded from any attempts to break it or cut it. Also, any attempt to separate the stud and flange members of the locking device 20 would require shearing the entire shank 27 of the utility lock 25. Further, the stud member is fully and closely received in the flange member, whereby no cracks or channels of access are present for the insertion of prybars or the like which could otherwise be used in attempts to forcefully separate the parts of the locking device 20.

The locking device 20 is relatively simple and inexpensive to manufacture, and does not require specialized castings, although a locking device of the same configuration can be made with the flange member fabricated of an integral cast piece if desired. It is readily adapted to existing electric meter boxes, or to other similar structures, to secure them in their closed position, and is highly resistant to forceful attempts at entry.

Referring now to FIGS. 5-8, another locking device 60 according to the invention herein is shown. The locking device 60 is also utilized to prevent the opening of an electric meter box 10 or the like, and utilizes a standard utility lock 25 as its locking member. The locking device 60 generally comprises a stud member 70 and a flange member 80, the latter including a flange 81.

The stud member 70 is secured to the electric meter box 10 by means of a machine screw 61 which passes through an opening 19 in the front wall 14 and is received in a threaded opening 71 of the stud member 70. The stud member 70 is preferably notched, as indicated at 73, to provide clearance for the flange 18 of the cover 16 of the electric meter box 10 when the cover 16 is in its closed position. The stud member 70 has a substantially rectangular cross sectional configuration, as best seen in FIG. 7. The upper surface 74 of the stud 70 is approximately level with the closed cover 16 of the electric meter box 10, as best seen in FIG. 8. An opening 75 is defined by the stud 70 for receiving the utility lock 25. The lock-receiving opening 75 includes an upper portion 76 of a diameter to receive the head 26 of the utility lock 25, and has a central portion 77 sized to receive the shank 27 of the utility lock 25. A larger lower portion 78 is also provided, wherein a shoulder 79 is defined for engaging the expansible balls 28 of the utility lock 25, wherein the utility lock 25 may be retained in the locking device 60.

The flange member 80 of the locking device 60 includes a flange 81 which is an integral extension of the top of a body portion 82. The body portion 82 comprises a rectangular loop when viewed from the end (FIG. 7), and defines a generally rectangular opening 84 in which the stud 70 is matingly received. A lock-receiving opening 83 is provided in the top wall of the body 82, and openings 83 and 75 align to admit the utility lock 25. The upper part of the head 26 of the utility lock 25 is surrounded by the flange member body 82 defining the opening 83.

The locking device 60 is utilized by first mounting the stud 70 to the front wall 14 of the electric meter box 10. With the cover 16 in its closed position, the flange member 80 is slipped over the stud 70 with the flange 81 overlying a marginal portion of the cover 16 opposite its hinge 17. The opening 83 in the flange member body 82 is aligned with the opening 75 in the stud 70, and the utility lock 25 is inserted into the aligned openings. The utility lock 25 is operated to extend its expansible balls 28 radially outwardly, wherein the expansible balls 28 seat under the shoulder 79 and prevent removal of the utility lock 25. The flange member 80 of the locking device 60 is prevented from being removed from the stud 70 by virtue of the presence of the head 26 of the utility lock 25 in opening 83.

The utility lock 25 is fully enclosed in the locking device 60, and is thereby protected against attempts to cut it or destroy it. Further, the shear strength of the utility lock 25 is utilized in maintaining the flange member 80 assembled on the stud 70. The stud 70 is closely received in the flange member 80, and their ends are flush when assembled together as best seen in FIGS. 5 and 6. Thus, there is little access for prybars or other tools of force to be used in any attempts to force open the locking device 60.

The flange member 80 of the locking device 60 may conveniently be fabricated of channel iron by first cutting a length of the channel iron from a piece of stock, and then cutting away three sides of the channel iron adjacent the body 82 to leave the protruding flange 81. The stud 70 is merely a length of rectangular stock having openings 71 and 75 formed therein. Thus the locking device 60 is easily and cheaply manufactured.

A third force-resistant locking device 100 according to the invention herein is illustrated in FIGS. 9–12. The locking device 100 generally comprises a stud member 110 and a flange member 120 which are secured together by a utility lock 25.

The stud member 110 of the locking device 100 is mounted to the front wall 14 of the electric meter box 10 by means of a machine screw 101 passing through an opening 19 in the wall 14, the threaded end of the machine screw 10 being received in an opening 111. An elongated metal bar 103 having a central opening 104 is disposed between the head of the machine screw 101 and the wall 14 of the electric meter box to serve as a washer, distributing the load of attaching the stud more evenly over the wall. It will be appreciated that such a bar 103 may also be used with the previously described locking devices 20 and 60, or that a simple washer may also be employed for this purpose. The stud 110 is generally rectangular, but is notched at 112 in order that the flange 18 of the cover 16 of the meter box may be accommodated adjacent the stud 110.

The flange member 120 of the locking device 100 includes a flange 121 extending from a lock-receiving body portion 122. The lock-receiving portion 122 includes a depending polygonal post 124, which is hexagonal in the embodiment illustrated. A lock-receiving opening 125 is formed through the flange member 120, more particularly through the body portion 122 and post 124, and includes an upper portion 126 adapted to receive the head 26 of the utility lock 25 and a lower portion 127 dimensioned to receive the portion of the shank 27 of the utility lock adjacent to its head 26. A tubular sleeve 130 is mounted in and extends from the opening 125, where it defines slots 131 for receiving a seal 55.

The stud member 110 of the locking device 100 defines an opening 115, which is matingly polygonal with and receives the post 124 of the flange member 120. The stud member 110 further defines a lock-receiving opening 117 which accommodates the lower portion of the shank 27 of the utility lock 25, and the opening 117 is provided with a circumferential radially extending groove 118 in which the expansible balls 28 of the utility lock 25 may seat.

In order to use the locking device 100, the stud member 110 is attached to the electric meter box 10 as described above. The cover 16 of the electric meter box is closed, and the post 124 of the flange member 120 is inserted into the opening 115 defined in the stud 110. The orientation of the flange member 120 is selected so that the flange 121 overlays a marginal edge portion of the cover 16. The utility lock 25 is inserted into the aligned lock-receiving openings 125 and 117 of the flange member 120 and stud 110 respectively, and the utility lock is locked to expand the balls 28 outwardly with respect to the shank 27. The utility lock is thereby secured in the locking device 100 and operates to secure the stud 110 and flange member 120 of the locking device 100 together, whereby the electric meter box 10 is prevented from being opened by the overlying flange 121. A seal 55 may be installed through slots 131 to prevent easy access to the utility lock 25 and to detect removal thereof.

The flange member 120 of the locking device 100 may be fabricated by utilizing a length of hexagonal stock which is inserted through a round opening formed in the remaining portion of the flange member 120. The hexagonal stock is welded to the remaining portion of the flange member 120 in the spaces between the round opening and the flats of the hex, as indicated at 129 of FIGS. 10 and 12. A portion of the hexagonal stock depends to form the polygonal post 124. The lock-receiving opening 125 is formed entirely in the hexagonal stock.

The locking device 100 fully encloses the utility lock 125, and prevents forceful attacks on it. The locking device 100 is of sturdy construction, and resists forceful attempts to separate its parts and gain access to the interior of the electric meter box.

Accordingly, all of the above-described locking devices admirably achieve the objects of this invention herein. It will be appreciated that they can be used to secure enclosures other than electric meter boxes. Similarly, the electric meter boxes can be of the type having a cover slidingly engaged with the back wall, rather than being hinged thereto. Changes from the structures of the preferred embodiments can be made such as by making the tubular sleeve integral with the flange member. Other changes can also be made without departing from the spirit and scope of the invention, which is limited only by the following claims.

I claim:

1. A locking device adapted for combination with electric meter boxes or the like of the type having a bottom, a back wall, side walls, a front wall and a cover hingedly or otherwise attached to the back wall and pivotal to a closed position, the locking device comprising:

(A) a stud member mounted to and extending outwardly from one of the walls other than the back wall of the meter box, the stud member defining a portion of a lock-receiving opening; and (B) a flange member including an L-shaped angle iron, one leg of the angle iron comprising a flange which overlays a marginal portion of the cover adjacent one of its free edges and the other leg extending downwardly therefrom adjacent the wall of the meter box, and a section of metal stock welded to the downwardly extending leg of the angle iron, the flange member defining a stud-receiving opening through the downwardly extending leg of the angle iron and at least a portion of the metal stock welded thereto whereby the flange member is removably received on the stud member with the stud in the stud-receiving opening, the metal stock defining the remaining portion of the lock-receiving opening which aligns with the portion of the lock-receiving opening defined by the stud member when the stud member and the flange member are assembled together, whereby the respective portions of the lock-receiving opening together receive and protectively enclose a utility lock of the type having a head, shank and locking balls which are expansible from the shank to engage a shoulder of the lock-receiving opening and thereby retain the utility lock in the lock-receiving opening, and shear strength of the utility lock securing the stud member and flange member together to maintain the electric meter box in its closed condition.

2. A locking device as defined in claim 1 wherein the stud member is mounted to the front wall of the electric meter box opposite the back wall and cover hinge.

3. A locking device as defined in claim 1 wherein the stud member defines a threaded opening for receiving a machine screw passing through the wall of the electric meter box to mount the stud member thereto.

4. A locking device as defined in claim 1 wherein the flange member includes a tubular sleeve extending outwardly from the portion of the lock-receiving opening accommodating the head of the utility lock, the tubular sleeve defining slots for receiving seal means to deter access to or tampering with the utility lock.

5. A locking device as defined in claim 1 wherein the stud-receiving opening extends entirely through the flange member and the stud member entirely fills the opening when the flange member and stud member are assembled together, the stud member and flange member together presenting a flush surface at the end of the stud-receiving opening in the flange member opposite the wall of the electric meter box.

6. A locking device as defined in claim 1 wherein the stud member comprises a rectangular base positioned adjacent the wall of the electric meter box and a cylindrical stud extending outwardly therefrom.

7. A locking device as defined in claim 1 wherein the stud member extends perpendicularly outwardly from the wall of the electric meter box to which it is mounted and the lock-receiving opening defined by the flange member and stud member is generally perpendicular to the closed cover.

8. A locking device as defined in claim 1 wherein the metal stock welded to the downwardly extending leg of angle iron has a flat surface in close contact with the surface of the angle iron.

9. A locking device as defined in claim 8 wherein the metal stock is polygonal.

10. A locking device as defined in claim 8 wherein the metal stock is rectangular.

11. A locking device adapted for combination with electric meter boxes or the like of the type having a bottom, a back wall, side walls, and a front wall and a cover hingedly or otherwise attached to the back wall and pivotal to a closed position, the locking device comprising:

(A) a stud member mounted to one of the walls other than the back wall of the electric meter box, the stud member comprising a cylindrical stud extending perpendicularly outwardly from the wall to which it is mounted, the cylindrical stud defining a portion of a lock-receiving opening disposed generally perpendicular to the closed cover of the electric metor box; and (B) a flange member comprising an L-shaped angle iron one leg thereof comprising a flange overlaying a marginal portion of the cover and a rectangular portion of metal stock welded to the other leg thereof to form a flange body, the flange body defining a stud-receiving opening generally parallel to the flange and passing through the depending leg of the angle iron and the metal stock welded thereto, the metal stock of the flange body further defining the remaining portion of the lock-receiving opening disposed generally perpendicular to the closed cover of the electric meter box the portions of the lock-receiving openings defined by the stud and the flange member being aligned to form the complete lock-receiving opening when the flange member is received on the stud member, the lock-receiving opening accommodating a utility lock of the type having a head, a shank and locking balls expansible outwardly from the shank to engage a shoulder of the lock-receiving opening and thereby retain the utility lock therein, the lock being fully enclosed and protected by the locking device and retaining the flange and stud members of the locking device together by its shear strength.

12. A locking device as defined in claim 11 and further comprising a tubular sleeve mounted in the portion of the lock-receiving opening receiving the head of the utility lock, the tubular sleeve extending outwardly from the flange member and defining slots receiving a seal.

13. A locking device as defined in claim 11 wherein the cover of the electric meter box has a flange overlapping the side walls and front walls when the cover is closed, and wherein the stud member comprises a base adjacent the wall of the electric meter box, the base spacing the flange member from the wall to accommodate the cover flange.

14. A locking device adapted for combination with electric meter boxes or the like of the type having a bottom, a back wall, side walls and a front wall and a cover hingedly or otherwise attached to the back wall and pivotal to a closed position, the locking device comprising a stud member mounted to one of the walls other than the back wall of the electric meter box and extending perpendicularly outwardly therefrom, the stud member comprising a rectangular base positioned adjacent the wall of the electric meter box and a cylindrical stud extending outwardly therefrom, the stud defining a portion of a lock-receiving opening, and a flange member defining an opening in which the stud is received, whereby the flange member is removably received on the stud member in an interengaging relationship, the flange member including a flange which overlaps a marginal portion of the cover adjacent one of its free edges, the flange member defining the remaining portion of the lock-receiving opening which aligns with the portion of the lock-receiving opening defined by the stud member and the flange member are assembled together, the lock-receiving opening defined by the flange member and stud member being generally perpendicular to the closed cover and intersecting the stud-receiving opening defined in the flange member, the respective portions of the lock-receiving opening together receiving and protectively enclosing a utility lock of the type having a head, shank and locking balls which are expansible from the shank to engage a shoulder of the lock-receiving opening and thereby retain the utility lock in the lock-receiving opening, whereby the shear strength of the utility lock in the lock-receiving opening prevents separation of the flange member and stud member and thereby secures the stud member and flange member together to maintain the electric meter box in its closed condition.

* * * * *

UNITED STATES PATENT AND TRADEMARK OFFICE
CERTIFICATE OF CORRECTION

PATENT NO. : 4,254,647

DATED : March 10, 1981

INVENTOR(S) : Frederick P. Finck, Jr.

It is certified that error appears in the above-identified patent and that said Letters Patent are hereby corrected as shown below:

Column 3, line 4, "metor" should be --meter--.

Column 3, line 21, "metor" should be --meter--.

Column 7, line 32 (claim 1), "and" should be --the--.

Column 8, line 20 (claim 11), "metor" should be --meter--.

Column 9, line 6 (claim 14), "overlaps" should be --overlays--.

Signed and Sealed this

Seventeenth Day of August 1982

[SEAL]

Attest:

GERALD J. MOSSINGHOFF

Attesting Officer

Commissioner of Patents and Trademarks